(12) United States Patent
Taguchi et al.

(10) Patent No.: US 7,580,272 B2
(45) Date of Patent: Aug. 25, 2009

(54) POWER SOURCE APPARATUS

(75) Inventors: Yasutaka Taguchi, Kanagawa (JP);
Satoshi Ichiki, Kanagawa (JP);
Hiroyuki Kinpara, Kanagawa (JP)

(73) Assignee: Fujitsu General Limited, Kanagawa (JP)

( * ) Notice: Subject to any disclaimer, the term of this patent is extended or adjusted under 35 U.S.C. 154(b) by 356 days.

(21) Appl. No.: 11/592,225

(22) Filed: Nov. 3, 2006

(65) Prior Publication Data

US 2007/0103947 A1 May 10, 2007

(30) Foreign Application Priority Data

Nov. 4, 2005 (JP) .............................. 2005-320968

(51) Int. Cl.
*H02M 5/42* (2006.01)
*G05F 1/10* (2006.01)

(52) U.S. Cl. ........................................ 363/89; 323/222

(58) Field of Classification Search ................ 323/222, 323/223, 225, 268, 271, 282, 283, 285; 363/39, 363/44–46, 84, 89, 125
See application file for complete search history.

(56) References Cited

U.S. PATENT DOCUMENTS

| 5,612,609 | A | * | 3/1997 | Choi | 323/210 |
| 5,614,812 | A | * | 3/1997 | Wagoner | 323/222 |
| 5,764,039 | A | * | 6/1998 | Choi et al. | 323/222 |
| 6,657,417 | B1 | * | 12/2003 | Hwang | 323/222 |

FOREIGN PATENT DOCUMENTS

| JP | 2001-349059 | 12/2001 |
| JP | 2004-7880 | 1/2004 |
| JP | 2005-253284 | 9/2005 |

* cited by examiner

*Primary Examiner*—Matthew V Nguyen
(74) *Attorney, Agent, or Firm*—McDermott Will & Emery LLP

(57) ABSTRACT

A boost chopper circuit converts AC power to DC voltage and supplies the DC voltage to a load. The boost chopper circuit includes a switching element and a reactor. A controller ON/OFF controls the switching element based on a comparison result in an interval of the former half of a half cycle of the AC power between a detected input current by a input current detector and a current instruction value of a modeling waveform obtained by reducing a harmonic component of a predetermined order from the current waveform.

8 Claims, 16 Drawing Sheets

POWER SOURCE APPARATUS

BACKGROUND OF THE INVENTION

1. Field of the Invention

The present invention relates to a control technique of a power source circuit that converts a commercial power source to a power source such as a home appliance machine.

2. Description of the Related Art

The present applicant has disclosed a conventional power source apparatus having a boost chopper-type power factor improvement and a harmonic current suppression function. In the conventional power source apparatus, to improve a power factor, when converting an input power to a DC voltage and obtaining a load voltage with a boost chopper circuit, a switching element of the boost chopper circuit is switched to flow short-circuit current via a reactor (boost choke coil). A controller that controls the power source apparatus turns ON or OFF the switching element based on a comparison result between a detected input current by an input current detector and a sinusoidal wave-like input current reference signal. The controller that controls the power source apparatus also switches, for every a half cycle of an AC power source, the switching element a predetermined number of times based on the detection of a zero cross by a power-source phase detection circuit. Thereafter, the switching of the switching element is prohibited to prevent the number of switchings for every half cycle of the AC power source from fluctuating.

The conventional power source apparatus is structured to perform a switching in a former half of the half cycle of the AC power source to improve a power factor to suppress a harmonic current. As a result, the conventional power source apparatus has achieves, for example, the following effects:

(1) the small number of switchings causes a reduced heat burden to a switching element such as an IGBT or a reverse blocking diode to reduce the size;
(2) the low switching frequency band causes reduced noise and thus less components for reducing noise are required; and
(3) reduced harmonic current allows low-cost material to be used for a reactor core.

FIG. 14 depicts a waveform of an input current and an instantaneous average value of a switching interval in the conventional power source apparatus (hereinafter, "conventional system"). A power source harmonic standard specifies up to 40-th harmonic currents (up to 2 kilo Hertz (kHz) for a power source of 50 Hertz (Hz) and up to 2.4 kHz for a power source of 60 Hz). Thus, when a switching basic frequency in a switching interval is equal to or higher than this, current in the switching interval is handled as an instantaneous average value in the manner represented by dotted lines in the drawing.

When the current is considered as an instantaneous average value as described above, a current waveform of an actual measurement value at an input current of 16 Arms is as shown in FIG. 15. The harmonic current value of the current waveform shown in FIG. 15 has an actual measurement value as shown in FIG. 16.

In FIG. 16, the horizontal axis represents a harmonic order n and the vertical axis represents a harmonic current value by the measurement using a reactor inductance of about 20 mH and input current of about 16 Arms. The bar graph represent a measurement result of harmonic current and the line graph shows values of the table 1 of the power source harmonic standard IEC61000-3-2.

When the 2-nd to 40-th harmonic current values shown in FIG. 16 are standardized by limit values shown in the table 1 of IEC61000-3-2, the result is as shown in FIG. 17. In FIG. 17, the horizontal axis represents a harmonic order n while the vertical axis represents an n-th harmonic rating exponent Yn as a standardized current value.

As shown in FIG. 17, in the conventional system, a high current region of about 16 Arms shows an increase of a 5-th harmonic unique to a partial switching PFC and a n-th harmonic exponent Yn exceeds 1, failing to clear the power source harmonic standard. Moreover, a current region of about 12 to 15 Arms also requires a high reactor inductance in order to satisfy the power source harmonic standard, thus increasing the cost of the power source apparatus.

SUMMARY OF THE INVENTION

It is an object of the present invention to at least partially solve the problems in the conventional technology.

According to an aspect of the present invention, a power source apparatus that converts AC power to DC voltage includes a power factor-improving unit that includes a reactor and a switching element and outputs an output voltage as a load voltage to a load; a current-instruction-value preparation unit that generates, as a current instruction value, a modeling waveform obtained by reducing a harmonic component of a predetermined order from a current waveform; and a switching control unit that ON/OFF-controls the switching element in an interval of the former half of a half cycle of the AC power based on a comparison result obtained by comparing an input current and the current instruction value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described in detail with reference to the drawings. It is noted that the embodiments do not limit this invention and all combinations of features described in the embodiments are not required for means for solving the problem of the invention. Components in the following embodiments include those that can be easily assumed by those skilled in the art and those having substantially the same structure. In the following embodiments, a case will be described where the 5-th harmonic component is reduced. However, the present invention is not limited to this and also can be applied to reduce a harmonic component having another order.

Figure 1:
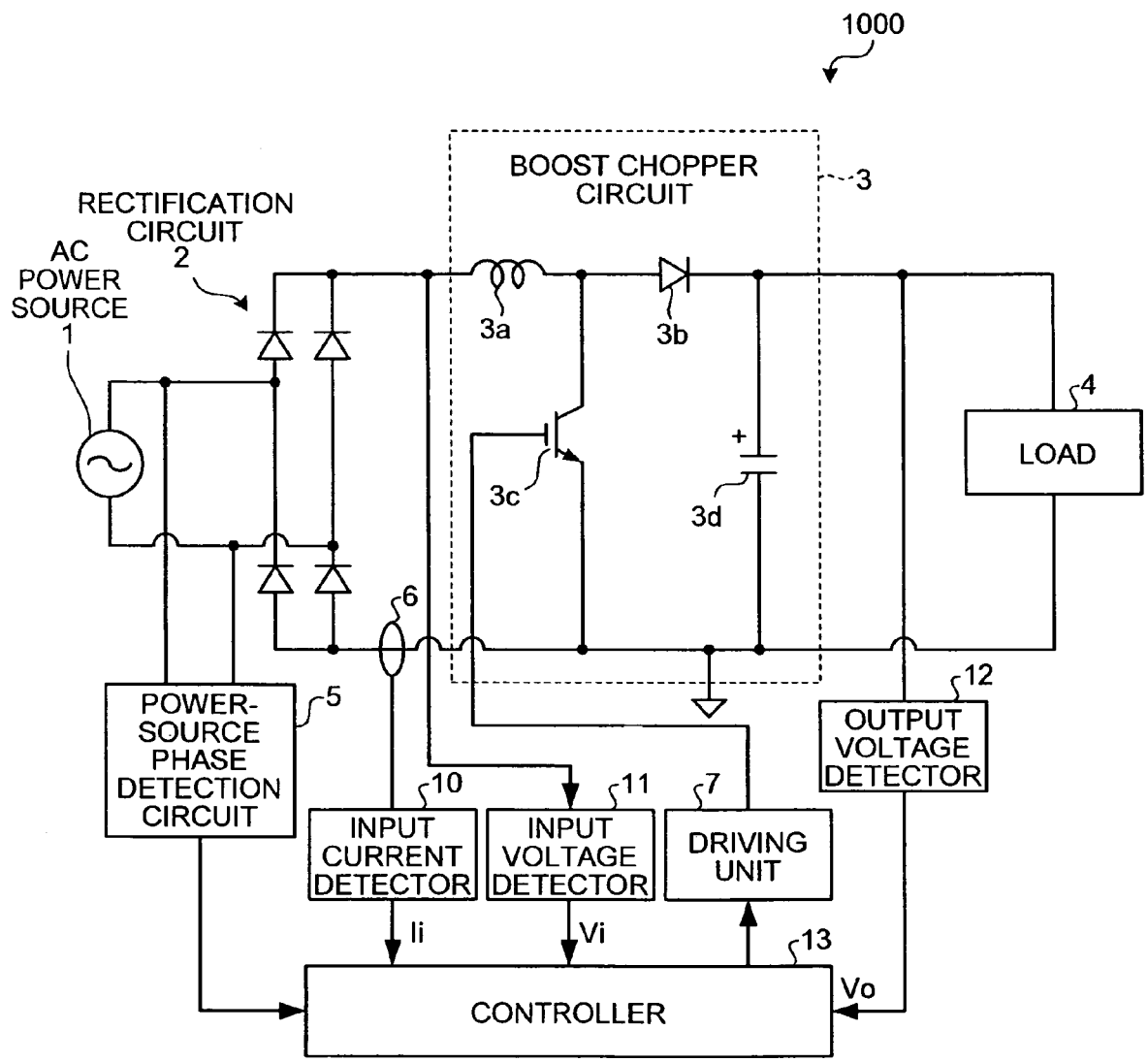
FIG. 1 is a schematic block diagram of a power source apparatus according to an embodiment of the present invention.

FIG. 1 is a schematic block diagram of a power source apparatus 1000 according to an embodiment of the present invention. According to the power source apparatus 1000, as in the conventional power source apparatus disclosed in Japanese Patent Application Laid-Open No. 2005-253284, an AC power source is converted to a DC voltage to use the converted DC voltage as a load voltage to flow short-circuit current at least via a reactor (boost choke coil), thereby improving the power factor of the converted voltage. The power source apparatus 1000 also performs the same control of the number of switchings and a bus voltage ratio control as in the conventional power source apparatus.

As shown in FIG. 1, the power source apparatus 1000 includes an AC power source 1; a rectification circuit 2; a boost chopper circuit 3; a load 4; a power-source phase detection circuit (power-source zero-cross detection unit in FIG. 2 and zero-cross timing detection in FIG. 13) 5 that detects the zero cross of the AC power source 1; a current sensor 6 that detects an input current Ii of the boost chopper circuit 3; a driving unit 7 that drives, based on these detection values and a signal from a controller 13, a switching element 3c; an input current detector 10 that detects the input current Ii of the boost chopper circuit 3 based on a detected signal from a current sensor (e.g., CT) 6; an input voltage detector 11 that detects the input voltage Vi of the boost chopper circuit 3; an output voltage detector 12 that detects an output voltage (bus voltage) Vo of the boost chopper circuit 3; and a controller 13, such as a microcomputer, for example, that outputs a signal for turning ON or OFF the switching element 3c to the driving unit 7 based on the detected current and/or voltage values or detected zero cross of an AC power source by the power-source phase detection circuit 5.

The boost chopper circuit 3 includes a reactor (boost choke coil) 3a serially connected to a positive terminal of the rectification circuit 2; a reverse blocking diode 3b serially connected to the reactor 3a; the switching element (e.g., insulated gate transistor (IGBT)) 3c connected to a negative terminal of the rectification circuit 2 between the reactor 3a and the reverse blocking diode 3b; and a smoothing capacitor 3d that smoothes an output voltage.

The boost chopper circuit 3 operates as follows. That is, the switching element 3c is switched to be short circuited so that current flows via the reactor 3a to the reverse blocking diode 3b and then to the smoothing capacitor 3d. When the present invention is applied, for example, to a compressor motor of an air conditioner the load is an inverter circuit and the motor.

The controller 13 turns the switching element 3c ON or OFF based on a comparison result between the input current Ii and a current instruction value. The output voltage Vo of the boost chopper circuit 3 is supplied to the load 4.

Figure 2:
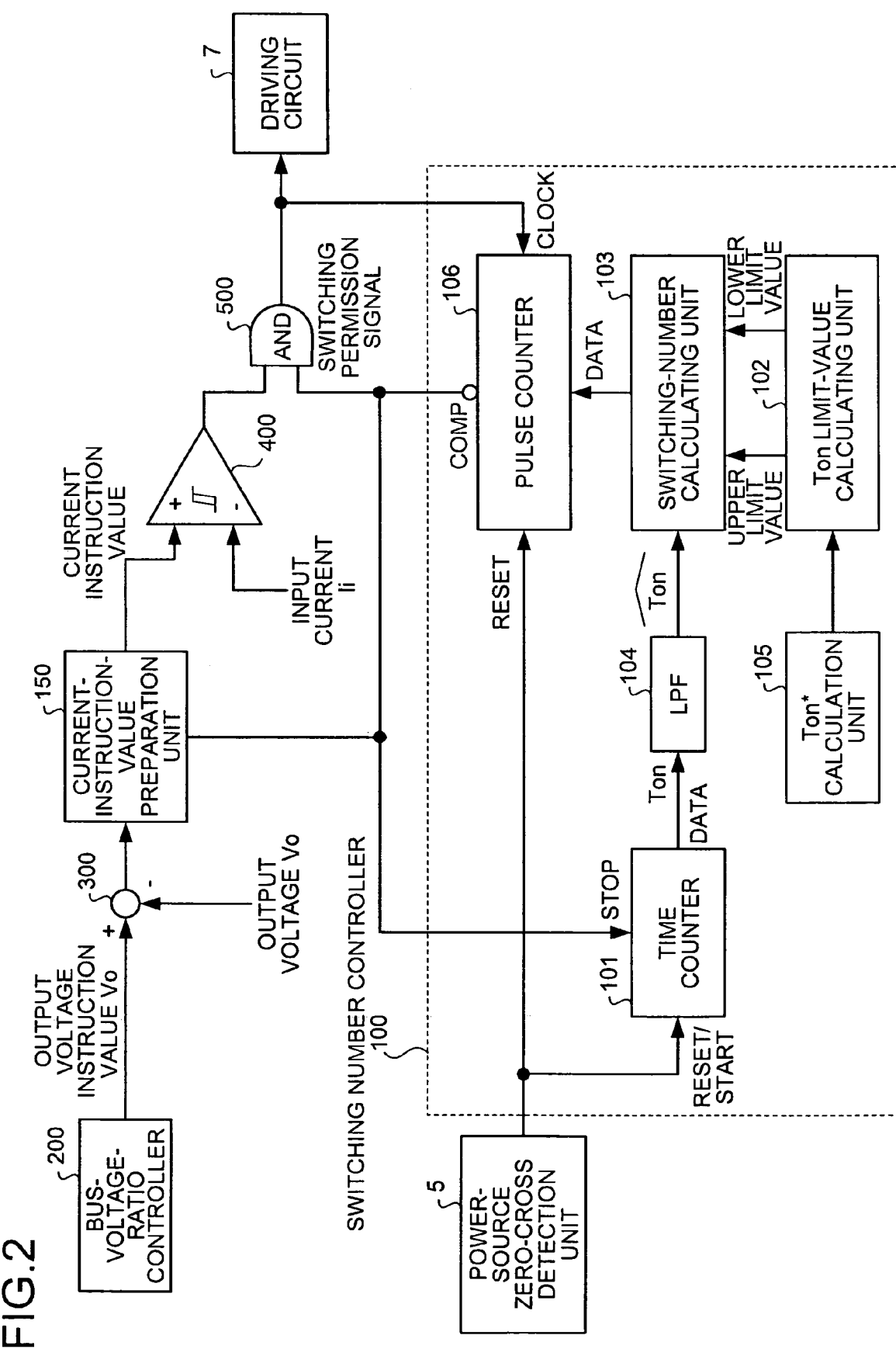
FIG. 2 is a detailed schematic block diagram of a controller shown in FIG. 1.
Figure 3:
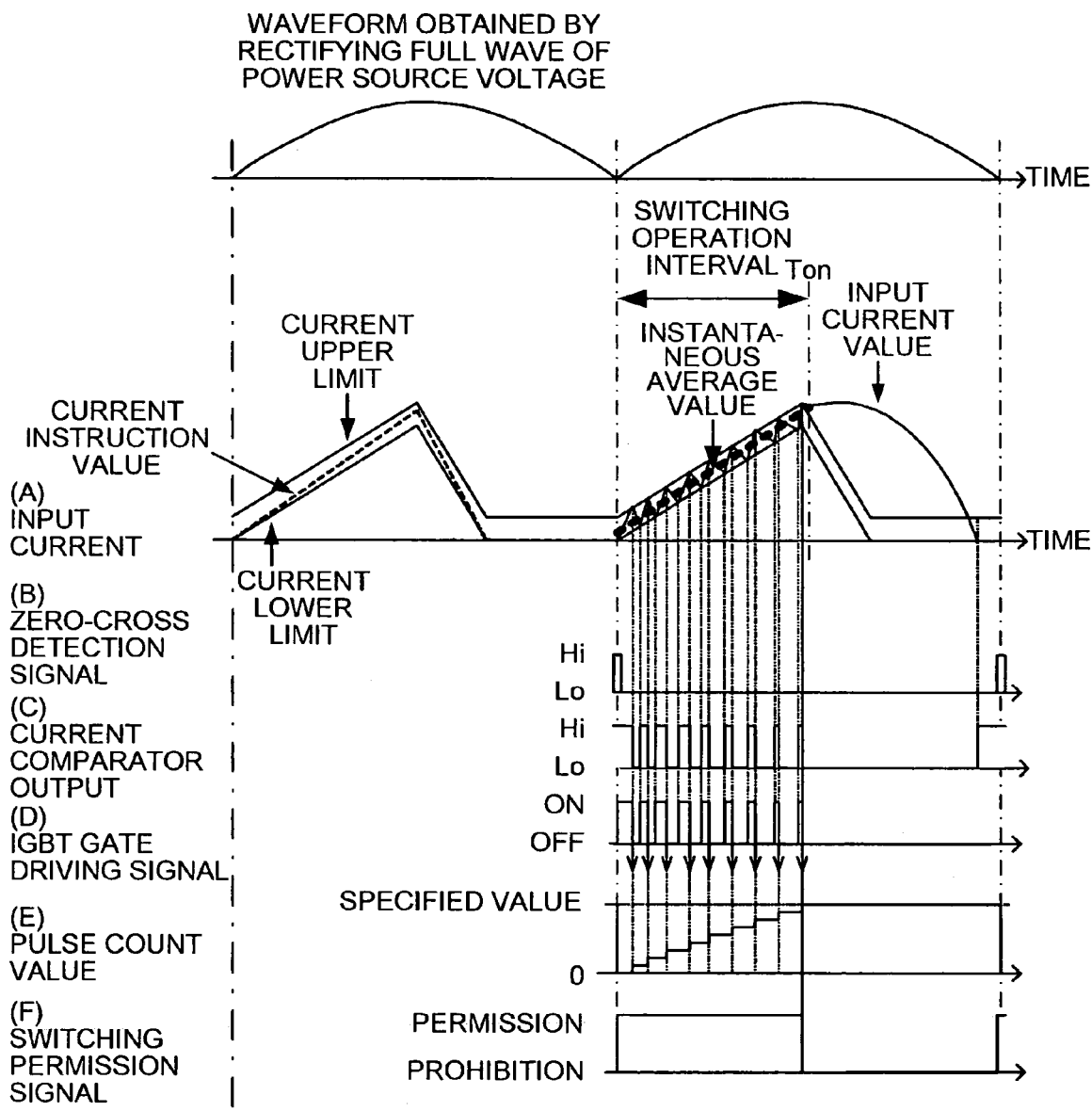
FIG. 3 is a waveform diagram and time chart for explaining the operation of the controller.

FIG. 2 is a detailed schematic block diagram of the controller 13. FIG. 3 is a waveform diagram and a time chart for explaining the operation of the controller 13. The controller 13 includes a switching-number controller 100; a current-instruction-value preparation unit 150; a bus-voltage-ratio controller 200; an arithmetic unit 300; a current comparator 400; and a logic circuit 500.

The bus-voltage-ratio controller 200 prepares an output-voltage instruction value (bus-voltage instruction value) based on Equation (1):

$$Vo^*(t) = Vimean(t)/Vimean(0) \times A \times Vo(0) \quad (1)$$

where

Vimean (t): Detected value of an average value of input voltages

Vimean (0): Unloaded voltage of Vimean (t)

Vo* (t): Output-voltage instruction value (bus-voltage instruction value)

Vo (t): Detected value of bus voltage

Vo (0): Unloaded voltage of Vo (t)

A: Instruction value of output bus voltage ratio

The switching-number controller 100 determines the number of switching(s) so that a switching operation is completed within an arbitrary period to output a switching permission signal. The switching-number controller 100 includes a time counter 101 that measures a switching operation interval time Ton; a Ton limit-value calculating unit 102 that outputs a value of a switching operation interval time Ton (upper limit value/lower limit value) by which an n-th harmonic rating exponent Ymax=1 is established; a switching-number calculating unit 103 that calculates the number of switching(s); a low-pass filter (LPF) 104; a Ton* calculating unit 105 that calculates an appropriate switching operation interval time; and a pulse counter 106 that counts the number of switching(s).

First, the arithmetic unit 300 calculates a voltage deviation between a output-voltage instruction value (load voltage instruction value) Vo* calculated by the bus-voltage-ratio controller 200 and an output DC detection voltage (bus voltage) Vo detected by the output voltage detector 12. From the voltage deviation, the current-instruction-value preparation unit 150 prepares a current instruction value of a modeling waveform for reducing a 5-th harmonic component (see (A) in FIG. 3). The detailed structure and operation of the current-instruction-value preparation unit 150 will be described later.

The current instruction value and the input current Ii detected by the input current detector 10 are compared by the current comparator 400. Based on this comparison result, the switching signal of the switching element 3c is prepared. Based on this switching signal, the boost chopper circuit 3 is controlled via the gate driving circuit 7 and the switching element 3c is switched by using the current instruction value as a reference and an input current waveform is obtained (see (A) in FIG. 3).

The pulse counter 106 counts the number of switching(s) of the switching element 3c (see (E) in FIG. 3). When the pulse counter 106 is reset, an output of the pulse counter 106 is at a level H, and it is at a level L when the count value reaches a predetermined value (set pulse value) set by the switching-number calculating unit 103 (see (F) in FIG. 3).

In this case, the switching element 3c is turned ON by the detection of zero cross (see (B) and (C) in FIG. 3). Thereafter, the input current Ii increases to reach the upper limit value and thus the switching element 3c is turned OFF (see (A) and (C) in FIG. 3). Then, the pulse counter 106 is incremented (see (D) and (E) in FIG. 3). By turning ON or OFF the switching element 3c in this manner, the input current Ii is allowed to have a current waveform following the current instruction value (see (A) in FIG. 3).

The operation of the switching-number controller 100 will now be described in detail. The Ton limit-value calculating unit 102 outputs a value of the switching operation interval time Ton (Ton upper limit value/lower limit value) by which Ymax=1 is established. This example will be described based on an assumption that the Ton upper limit value is 3.10 milliseconds (ms) and the Ton lower limit value is 2.75 ms. As described later, the Ton upper limit value/lower limit value of the switching operation interval time Ton may be changed depending on conditions such as a magnitude of input current. In this case, the Ton limit-value calculating unit 102 calculates, based on the conditions such as the magnitude of the input current, an optimal Ton upper limit value/lower limit value.

By a reset signal of a detected power source phase signal (zero cross) by the power-source zero-cross detection unit 5, the pulse counter 106 and the time counter 101 are reset. As a result, the time counter 101 starts measuring the switching operation interval time Ton. The pulse counter 106 counts the number of switching(s) of the switching element 3c. When the counter value reaches a predetermined value (set pulse value, 5 in this example) that has been previously set, an output of the pulse counter 106 (see (F) in FIG. 3) is at the level L, thereby stopping the measurement of the switching operation interval time Ton by the time counter 101. Thus, the time counter 101 outputs the switching operation interval time Ton when the number of switchings is 5. This example is based on an assumption that the switching operation interval time Ton at this time is 2.70 ms for example.

On the other hand, the Ton limit-value calculating unit 102 outputs the values of the Ton upper limit value/lower limit value (upper limit value of 3.10 ms and lower limit value of 2.75 ms) to the switching-number calculating unit 103. The switching-number calculating unit 103 compares the switching operation interval time Ton with the Ton upper limit value/lower limit value. In this case, the switching operation interval time Ton is lower than the Ton lower limit value. Thus, the set pulse value set in the pulse counter 106 is increased by 1 (6 in this example). As a result, the pulse counter value is increased to 6 from the next cycle (zero cross) to proportionally increase the switching operation interval Ton, thus providing a control in a direction along which the switching operation interval Ton is higher than the lower limit value. Here, a pulse having a high pulse counter value has a relatively small pulse width. Thus, by increasing or decreasing such a pulse, the switching operation interval time Ton can be adjusted within a range of the upper limit value/lower limit value of Ton.

On the other hand, in contrast with the above example, when the comparison by the switching-number calculating unit 103 between the switching operation interval time Ton and the Ton upper limit value/lower limit value shows that the switching operation interval time Ton is higher than the Ton upper limit value, the set pulse value set in the pulse counter 106 is reduced by 1 (4 in this example). Thus, the pulse counter value of 4 from the next cycle (zero cross) proportionally reduces the switching operation interval time Ton, thus providing a control in a direction along which the switching operation interval time Ton is lower than the Ton upper limit value.

As described above, the switching-number calculating unit 103 compares the switching operation interval time Ton with the Ton upper limit value/lower limit value. Based on the comparison-result, the set pulse value set in the pulse counter 106 is increased or reduced by 1. As a result, the subsequent switching operation interval time Ton is within the range between the Ton upper limit value and the Ton lower limit value. Thus, if a control is provided based on the result of FIG. 7 such that the switching operation interval time Ton is always within a range of Ymax=1, the power source harmonic regulation value can be satisfied even if the above variation in members exists.

As described above, the switching operation interval time Ton as a switching permission signal width corresponding to the output of the pulse counter 106 detected by the time counter 101 is compared with the Ton upper limit value/lower limit value calculated by the Ton limit-value calculating unit 102 by the switching-number calculating unit 103. Based on the comparison result, the counter data of the pulse counter 106 is set. Then, the switching element 3c (see FIG. 1) performs a specified number of switching(s) set in the pulse counter 106.

In the above, a change in the number of switching(s) causes a transient state in an input current waveform. Thus, it is desirable that a changed cycle is longer than a power source cycle to have about few seconds and the low-pass filter 104 is used to perform a filtering processing of the switching operation interval time Ton (averaging of variation of the switching operation interval time Ton, noise removal).

Alternatively, the Ton upper limit value/lower limit value of the switching operation interval time Ton also may be changed depending on the magnitude of input current (an upper limit value may be smaller than a value of 3.05 ms to 3.10 ms and the Ton lower limit value may be larger than a value of about 2.3 ms) so that the value is changed depending on the magnitude of input current. As a result, a high power factor can be maintained to a range from a small load to a heavy load. For example, in the case of a small load, the Ton upper limit value can be set to be smaller than a value of 3.05 ms to 3.10 ms (e.g., 2.9 ms) to reduce the number of switchings of the switching element 3c, thereby reducing a switching loss. In the case of a heavy load on the other hand, the Ton lower limit value can be set to be higher than a value of about 2.8 ms (e.g., 2.9 ms), thereby improving the power factor.

With reference to FIG. 4 to FIG. 9, a current instruction value prepared by the above current-instruction-value preparation unit 150 and the shaping of an input current waveform will be described. The present applicant has introduced, in order to reduce the 5-th harmonic component, a model formula of a model current instruction value by the method as shown below.

Figure 4:
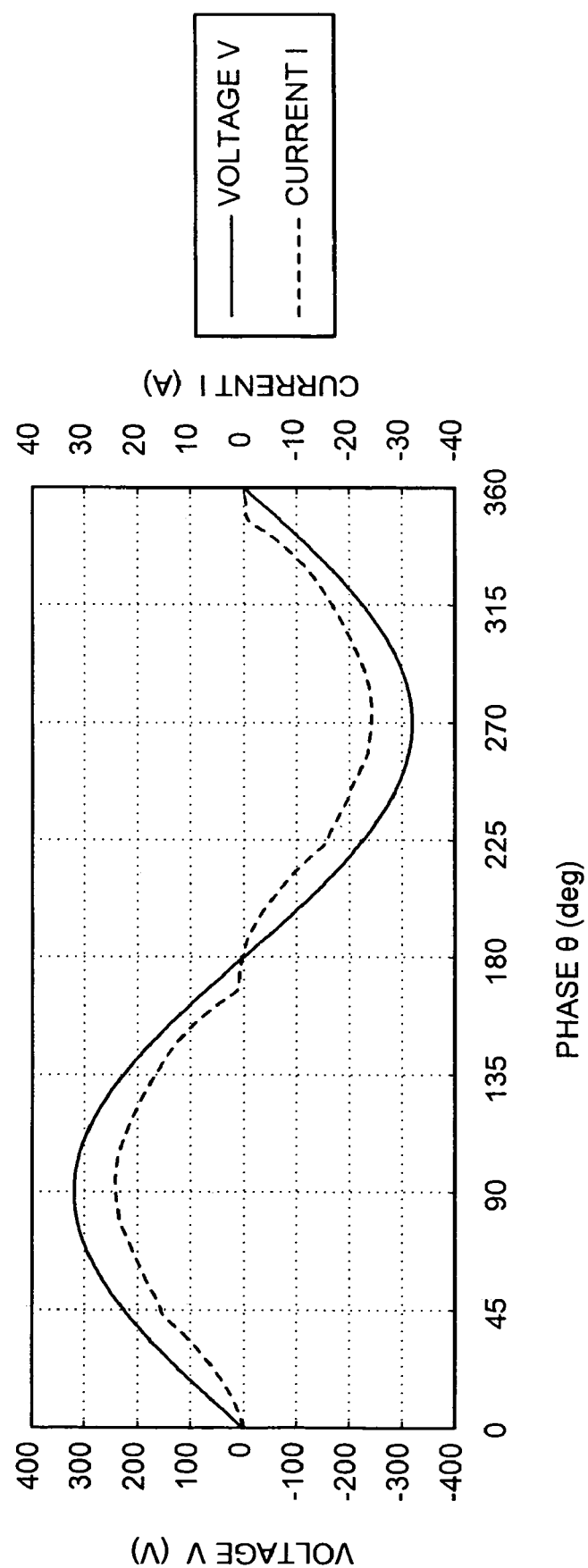
FIG. 4 depicts a current waveform obtained by developing 1-st to 50-th harmonic components along the time axis when the 5-th harmonic component is 50% smaller than the conventional one.
Figure 5:
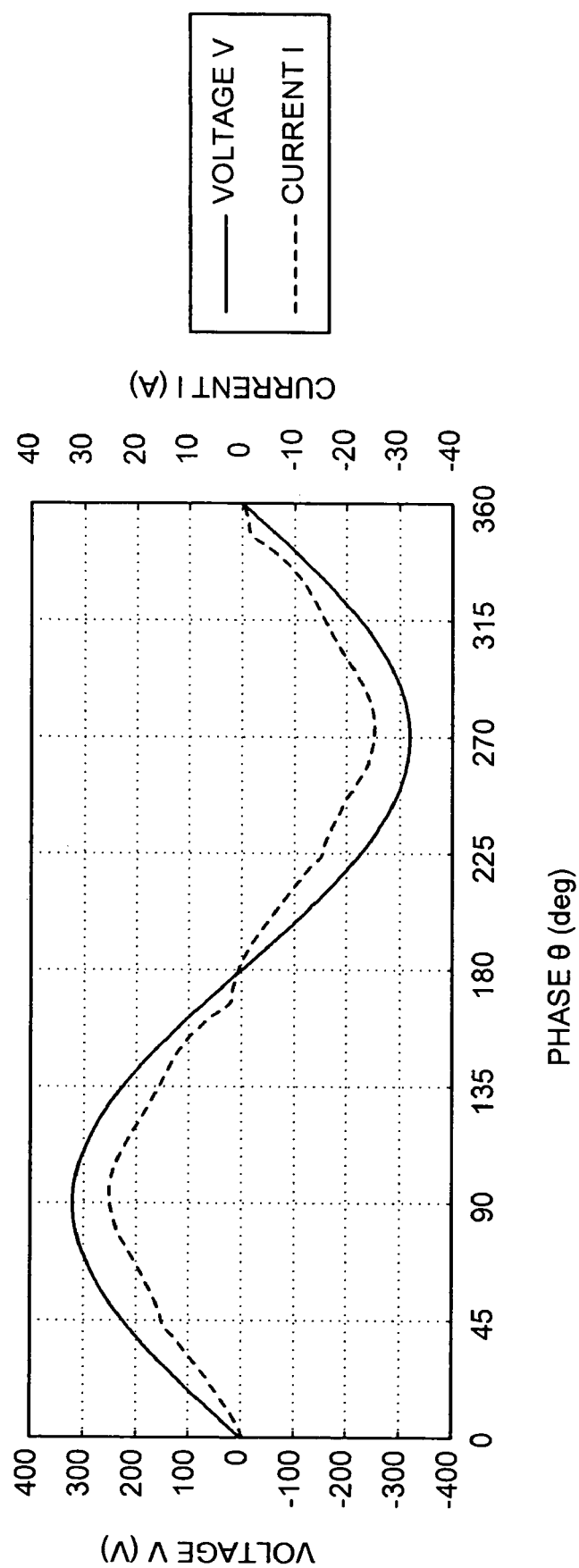
FIG. 5 depicts a current waveform obtained by developing 1-st to 50-th harmonic components along the time axis when the 5-th harmonic component is 0% smaller than the conventional one.
Figure 15:
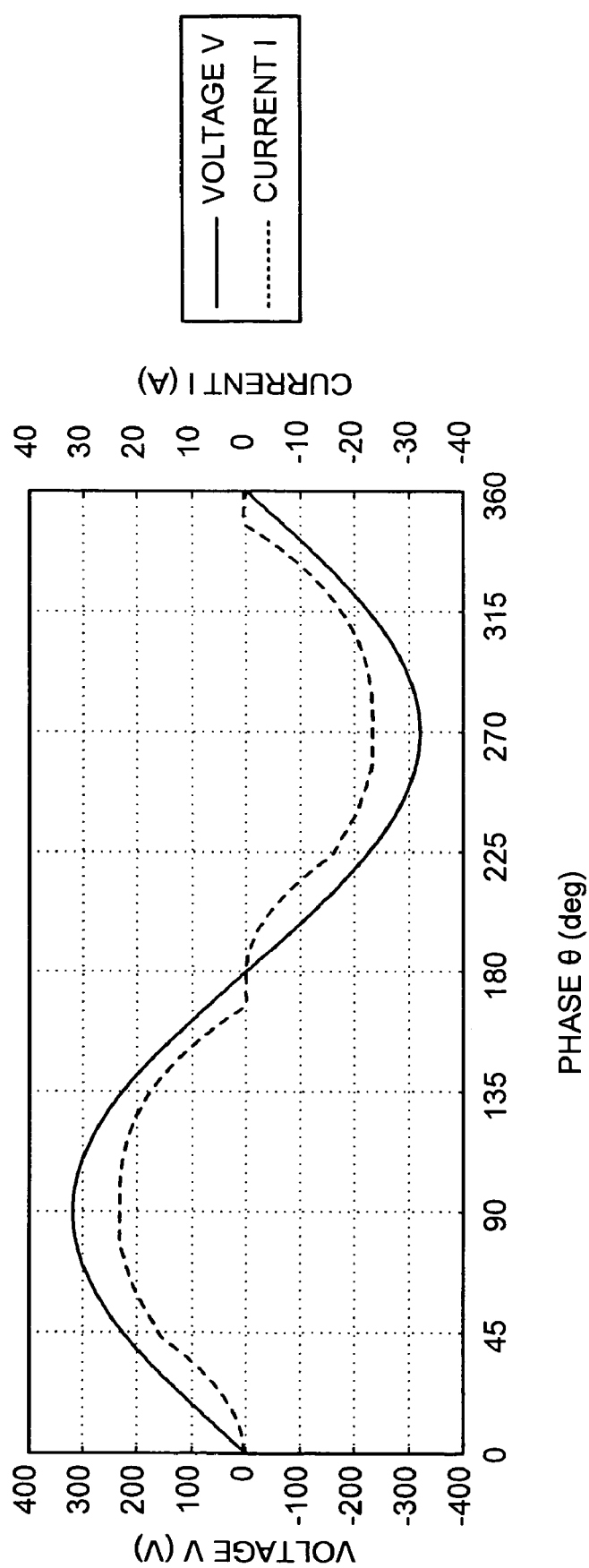
FIG. 15 is a graph for explaining an actual measurement value when an input current is 16 Arms in the conventional system.
Figure 16:
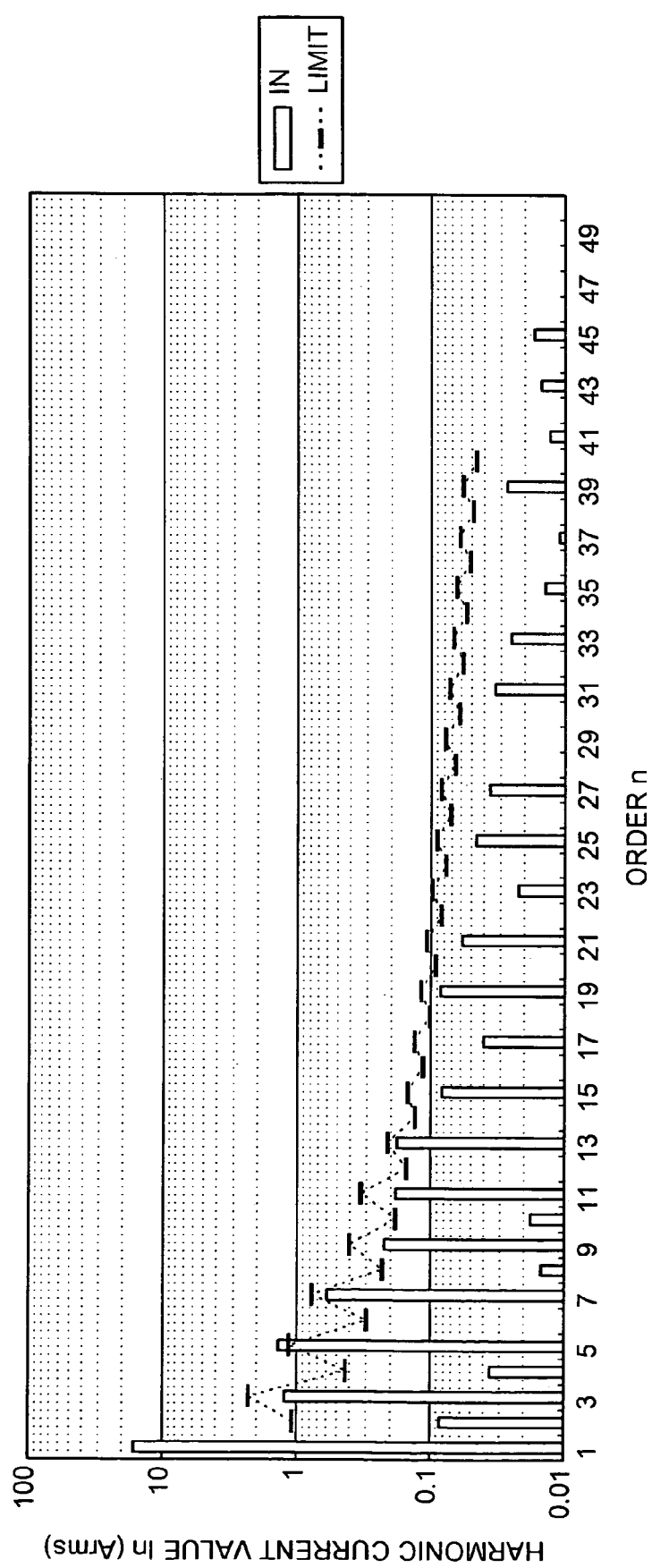
FIG. 16 Diagram showing an actual measurement value of a harmonic current value according to the current waveform of the conventional system.
Figure 17:
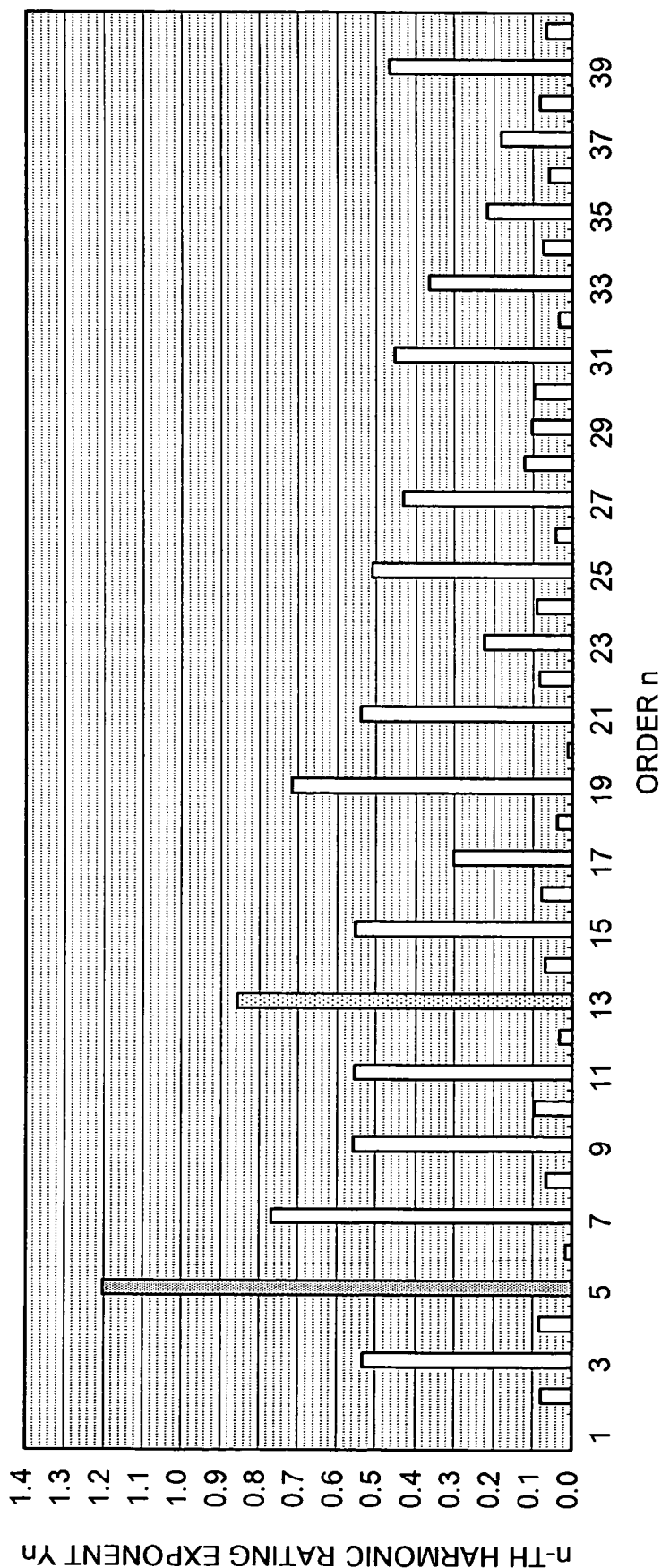
FIG. 17 depicts distribution of values obtained by standardizing the harmonic current values of FIG. 16.

A virtual waveform when the 5-th harmonic component is reduced from the current waveform of the conventional system shown in FIG. 15 is as shown in FIG. 4 and FIG. 5. FIG. 4 shows a current waveform obtained by developing 1-st to 50-th harmonic components along the time axis when the 5-th harmonic component is 50% smaller than the conventional one. FIG. 5 shows a current waveform obtained by developing 1-st to 50-th harmonic components along the time axis when the 5-th harmonic component is 0% smaller than the conventional one. In the drawings, the horizontal axis represents a phase [deg] and the vertical axis represents a current [A] and a voltage [V].

As shown in FIG. 4 and FIG. 5, when the 5-th harmonic component is reduced, the swelling of the current waveform in the switching interval (e.g., phase θ is between 45 degrees to 90 degrees) is gentle to have a shape closer to that of a triangular wave (straight line). Thus, by controlling the current in the switching interval to have not a waveform of a power source voltage (sinusoidal wave) but a straight-line waveform, the 5-th harmonic component can be reduced.

Figure 6:
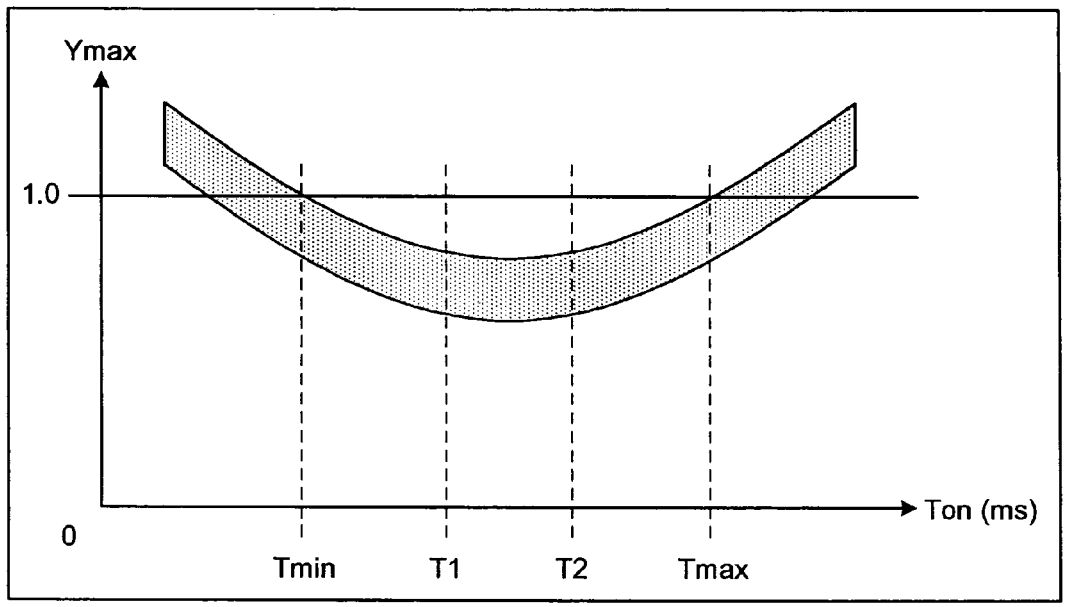
FIG. 6 is a graph of switching operation interval time Ton of a switching operation region and harmonic rating exponent Ymax.

The embodiment will be described with an actual measurement value. FIG. 6 shows a relation between the switching operation interval time Ton and the maximum harmonic rating exponent Ymax (maximum value of Yn) in order to clear the harmonic standard. In FIG. 6, the U-shaped curve represents a safety zone. The U-shaped curve changes depending on a reactor inductance, an input current effective value, and an output voltage for example. Specifically, the U-shaped curve shows the following behaviors for example: (1) the shift of the U-shaped curve itself in the lower direction with an increase of a reactor inductance; (2) the shift of the U-shaped curve itself in the upper-right direction with an increase of input current; and (3) an increase of the curvature of the U-shaped curve with an increase of an output voltage to cause a reduced width between Tmin and Tmax.

Thus, when the reactor inductance is increased and the output voltage is reduced (e.g., about 94% of an amplitude of a waveform of a power source voltage), then the harmonic standard can be cleared easily. However, an excessively-high reactor inductance increases a core size, which causes an increased cost. An output voltage set to have an excessively low value also causes the reduction of the maximum number of rotations when the load 4 is a brushless DC motor for example. An application to an air conditioner in particular may cause a problem such as reduction of the maximum capability.

Specifically, it is desirable for an air conditioner in particular to set a reduced reactor inductance and to set an increased output voltage in the case of a high load output requiring a high output from a motor. In this case, it is understood that a switching completion target time to the harmonic standard must pass the interval shown in FIG. 6 at which the U-shaped safety zone is narrow and must shift to the right by an input current effective value.

The shaping of a current waveform for the entire input current will be considered.

(1) Current Waveform of an Interval (Active Interval) in which a Switching Operation is Performed In this interval, input current follows a current instruction value as shown in the above FIG. 3(a), thus showing an almost straight-line increase.

(2) Current Waveform of an Interval (Passive Interval) in which a Switching Operation is not Performed In this interval, an input current Iac when the switching element 3c is in an OFF status can be represented by Equation (2) when assuming that a full-wave current of input current (absolute value) is Iac[A]; a full-wave voltage of an input power source voltage (absolute value) is Vac[V]; an output voltage is Vdc[V]; and an inductance of a reactor 3 is L[H].

$$Iac = 1/L \times \int (Vac - Vdc) dt \qquad (2)$$

Thus, an interval in which an input voltage is larger than an output voltage causes an increased current, an interval in which an input voltage is substantially equal to an output voltage causes a constant current, and an interval in which an input voltage is smaller than an output voltage causes reduced current. When a relation between an input voltage and an output voltage in a passive interval is controlled so that "input voltage<output voltage" is established, a triangular wave can be obtained in the entire current waveform. When the relation is started form such an interval in which "input voltage≈ output voltage" is established, then an interval in which "input voltage<output voltage" is passed. Thus, the entire input current waveform has a trapezoidal wave-like shape.

Figure 7:
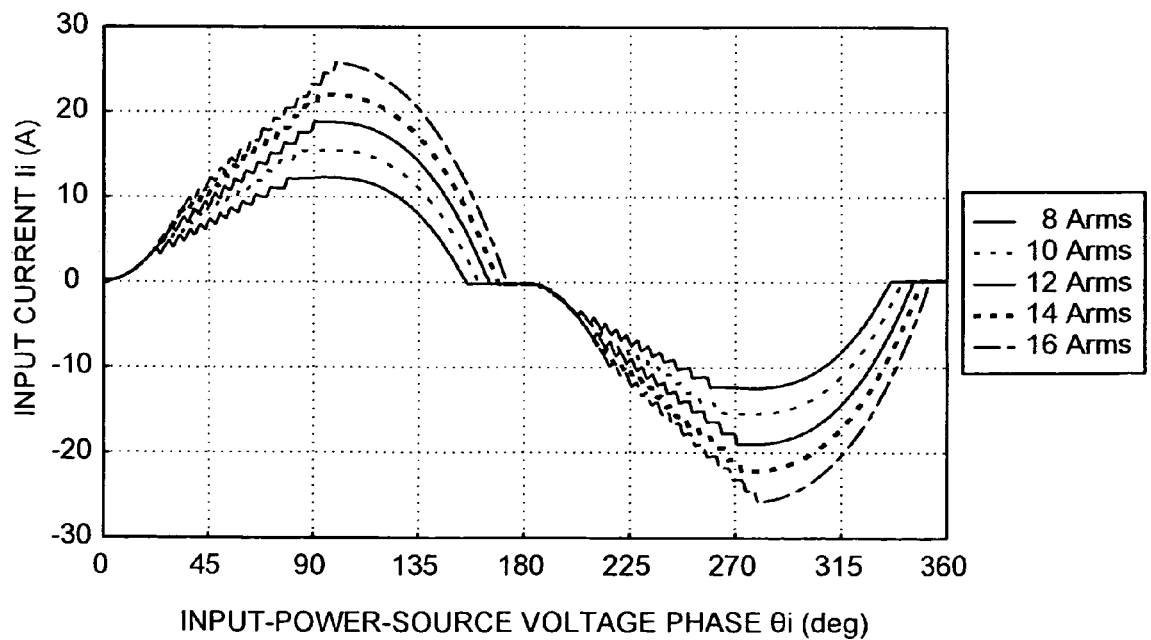
FIG. 7 depicts a current waveform when the switching operation interval time is changed to an optimal value in accordance with the U-shaped curve shown in FIG. 6 for every input current effective value.

FIG. 7 shows a current waveform when the switching operation interval time Ton is changed to an optimal value in accordance with the U-shaped curve shown in FIG. 6 for every input current effective value (8 Arms, 10 Arms, 12 Arms, 13 Arms, 16 Arms). Output voltage conditions of the drawing include an output voltage set to be substantially 98% of a power source voltage amplitude.

Figure 8:
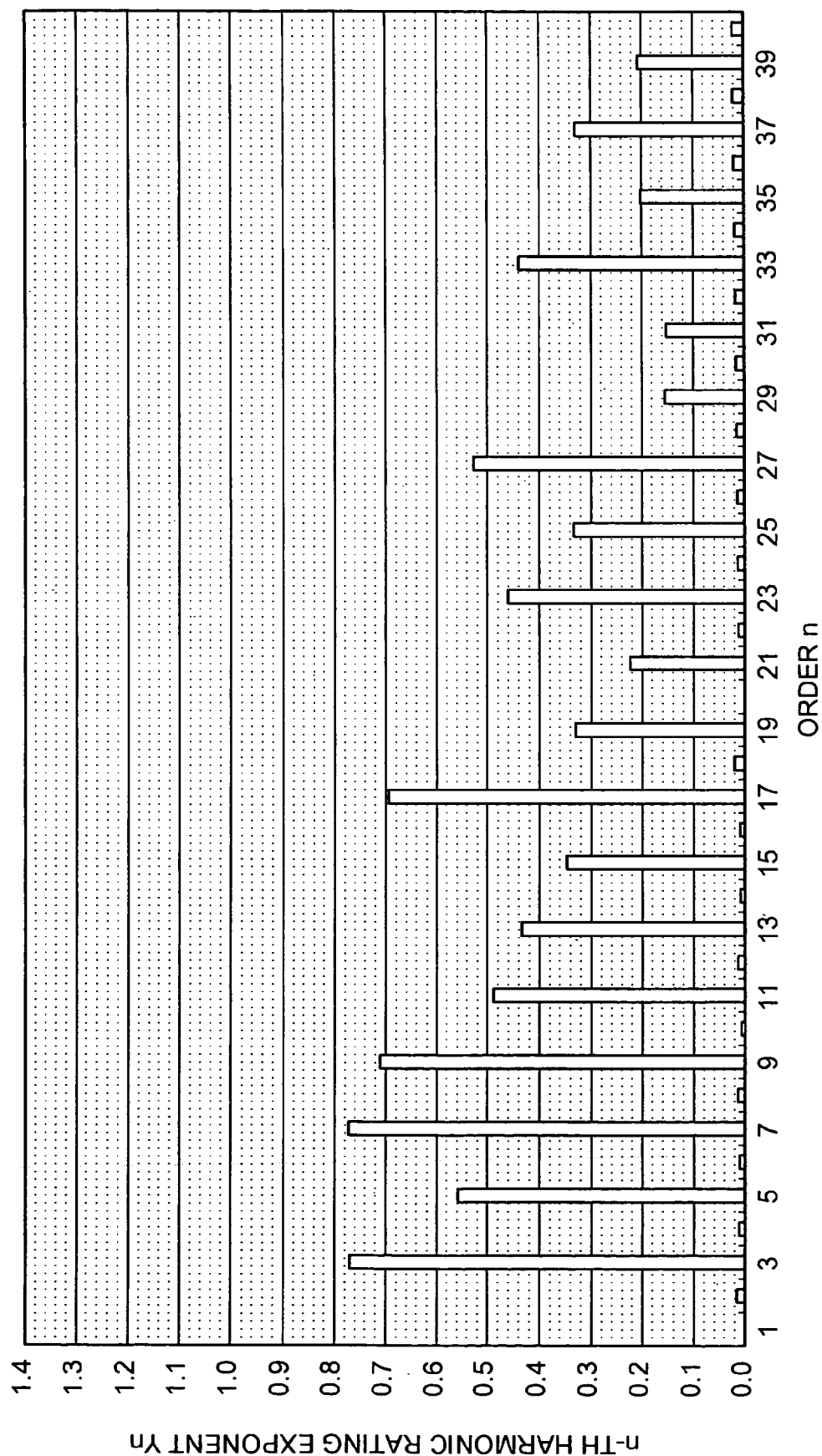
FIG. 8 is for explaining harmonic characteristic in the case of 12 Arms in FIG. 7.
Figure 9:
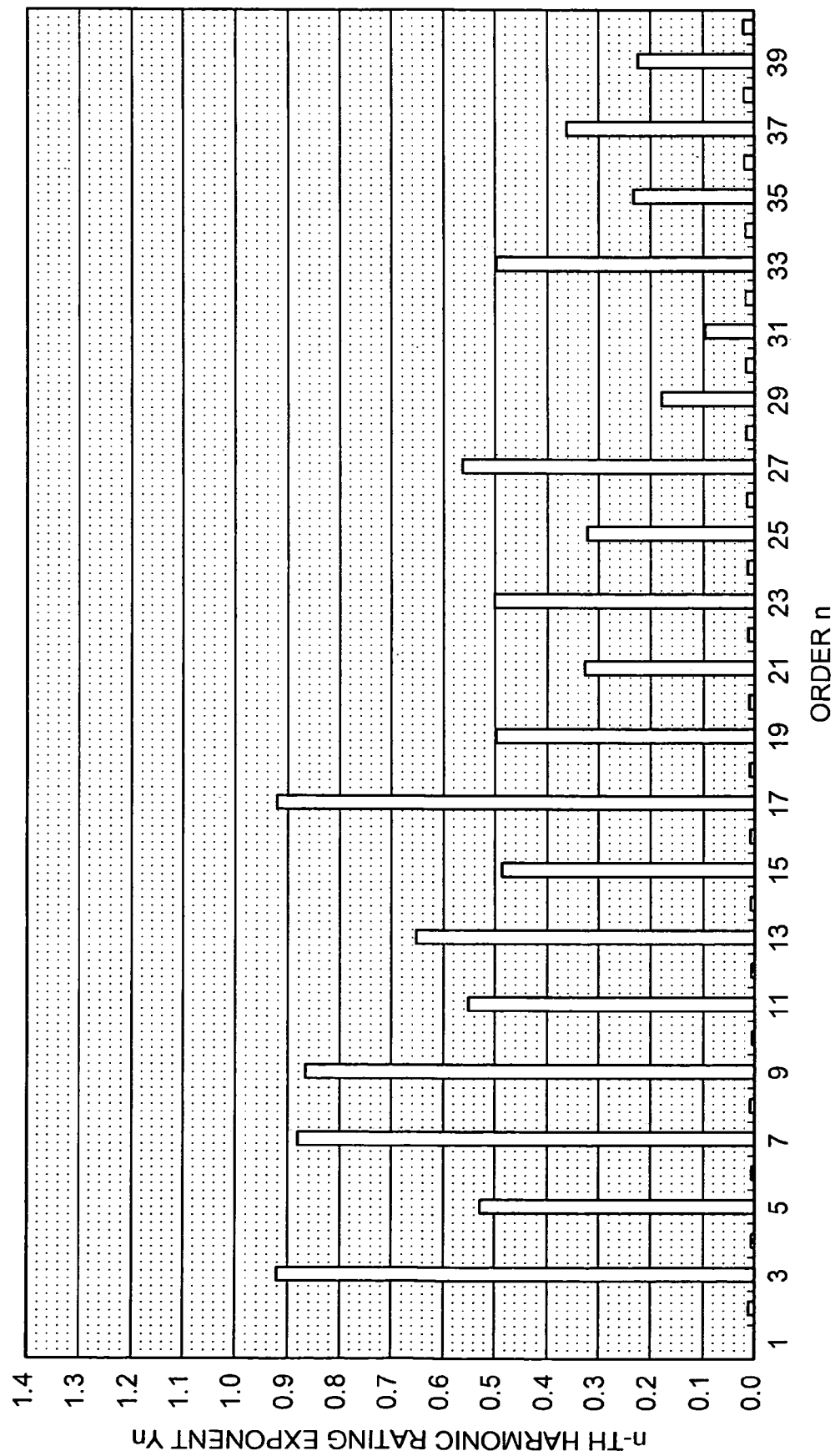
FIG. 9 is for explaining harmonic characteristic in the case of 16 Arms in FIG. 7.

As shown in the drawing, a low input current of 8 Arms means a trapezoidal waveform, an input current of 12 Arms means a reduced upper base interval of the trapezoidal wave, and a high input current of 16 Arm means a triangular waveform. The switching operation interval time Ton is 5.0 ms for 12 Arms and 5.5 ms for 16 Arms. A harmonic characteristic for 12 Arm in the drawing is shown in FIG. 8 and a harmonic characteristic for 16 Arm in the drawing is shown in FIG. 9. As shown in FIG. 8 and FIG. 9, it is understood that the 5-th harmonic component is reduced and the power source harmonic regulation is satisfied. As described above, when an input current is increased and the switching operation interval time Ton is changed in accordance with an effective value of the input current, the power source harmonic regulation can be satisfied.

In this manner, a waveform obtained by controlling a current instruction value in a straight line-like manner includes a triangular wave having a gentle inclination and a rectangular wave having a large inclination. These waveforms have harmonic components having the following characteristics (only odd number).

(1) In the Case of Triangular Wave

As the order is higher, the harmonic component is proportional with an inverse square of the order and the current value In of the n-th harmonic is In ∝1/n2.

(2) In the Case of Rectangular Wave

As the order is higher, the harmonic component is in inverse proportion to the order and the current value In of the n-th harmonic is In ∝1/n.

On the other hand, the harmonic standard limit value is generally at a position between the former and the latter. A relation among inclinations of the respective harmonic envelopes is triangular wave>harmonic standard limit value>rectangular wave.

This relation means that a low order component is severe when a triangular wave is modeled while a high order component is severe when a trapezoidal wave is modeled. Thus, by using a waveform that is an intermediate between a triangular wave and a trapezoidal wave (an intermediate between a triangular wave and a rectangular wave) as a current instruction value or by preparing a current instruction value separately using a triangular wave and a trapezoidal wave, it is easy to clear the harmonic standard limit value.

Figure 10:
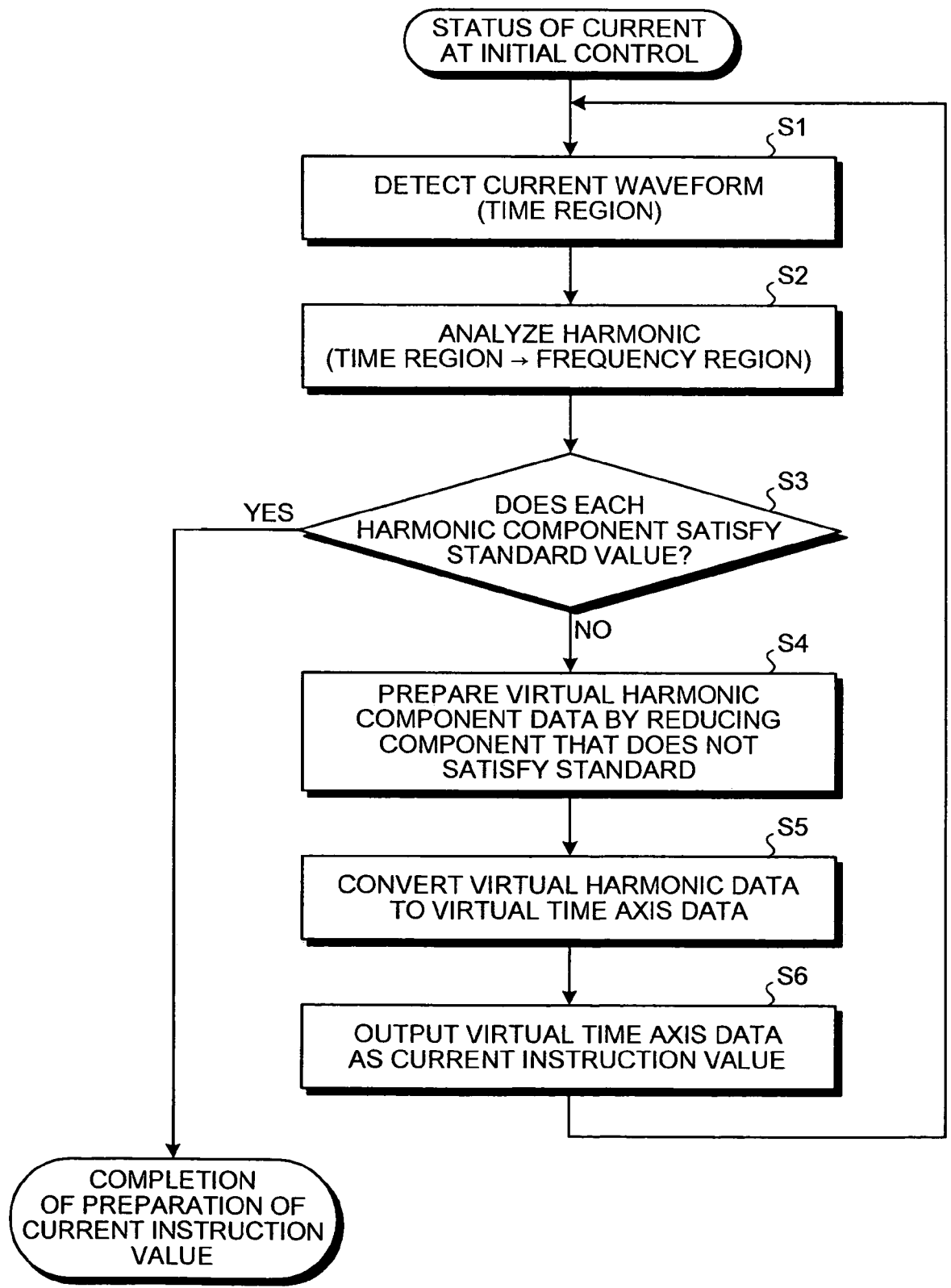
FIG. 10 is a flowchart of a procedure for preparing a modeling waveform of a current instruction value.

FIG. 10 is a flow showing a procedure for preparing a modeling waveform of the current instruction value. The procedure by the flow shown below can be performed by a personal computer for example. In FIG. 9, in a target power source apparatus, the detection of a current waveform (time region) in an initial control current status is firstly performed (Step S1). The detected current waveform is subjected to a harmonic analysis (time region→frequency region) (Step S2).

Whether each harmonic component satisfies the standard value or not is determined (Step S3). When all harmonic components satisfy the harmonic standard value ("Yes" in Step S3), the processing is completed.

On the other hand, when there is a harmonic component not satisfying the harmonic standard value ("No" in Step S3), virtual harmonic data in which the component not satisfying the harmonic standard value is reduced is prepared (Step S4). Then, the virtual harmonic data is converted to virtual time axis data (modeling waveform) (Step S5) and the virtual time axis data is used as a current instruction value (Step S6).

As described above, in this embodiment, a modeling waveform for reducing a predetermined harmonic component (fitting curve of current waveform (triangular wave, trapezoidal wave, rectangular wave)) is calculated and it is used as a current instruction value in a half cycle of a power source voltage or in all cycles of the power source voltage. This modeling waveform has a shape that changes depending on the reactor inductance, the input current effective value, the output voltage or the like of an applied power source apparatus. Thus, such a shape that is preferable for the applied power source apparatus is used.

As described above, the preparation of the current instruction value for reducing the 5-th harmonic component and the shaping of an input current waveform can be performed in the manner as described below.

(1) A modeling waveform can be defined, when "Y" is assumed as a modeling waveform (current instruction value), "t" is assumed as a time passed since a zero cross or a phase, "a" is assumed as an arbitrary constant (inclination), and "b" is assumed as an arbitrary constant (offset), by a function of Y=a×t+b by using a power source voltage zero cross as a reference.

(2) When an input current waveform is shaped to a modeling waveform, a switching operation is performed in the former half of a half cycle of an AC power source to allow an input current waveform to follow a current instruction value and the magnitude of an output voltage is adjusted in the latter half of the half cycle of the AC power source.

(3) When an input current waveform is shaped to a triangular waveform, a switching operation is performed in the former half of a half cycle of an AC power source to allow an input current waveform to follow a current instruction value and a control is provided to flow current by a passive operation in the latter half of the half cycle of the AC power source.

(4) When an input current waveform is shaped to a substantially-trapezoidal waveform, a switching operation is performed in the former half of a voltage of a half cycle of an AC power source to allow an input current waveform to follow a current instruction value and current is flowed by a passive operation in the latter half of the half cycle of the AC power source and an output voltage is controlled to control the length of an upper base interval of a trapezoidal wave of the input current waveform.

Figure 11:
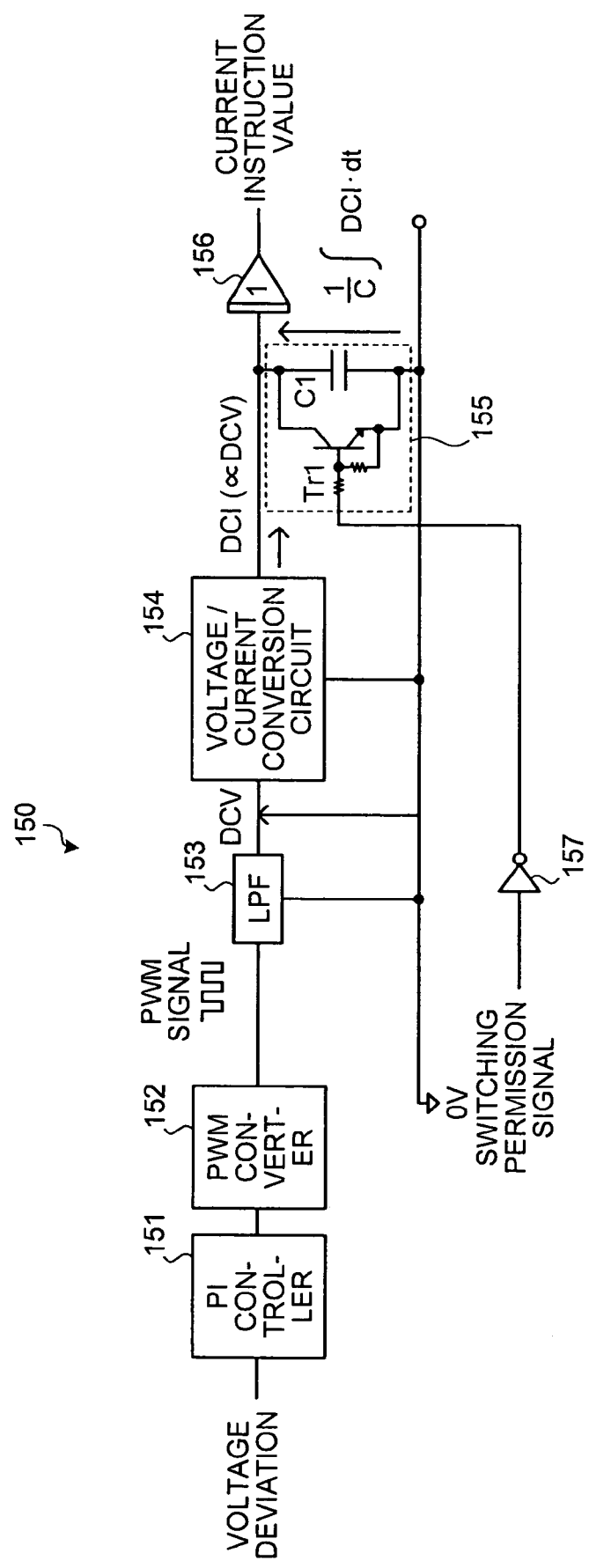
FIG. 11 is a detailed structural diagram of a current instruction value preparation unit shown in FIG. 2.
Figure 12:
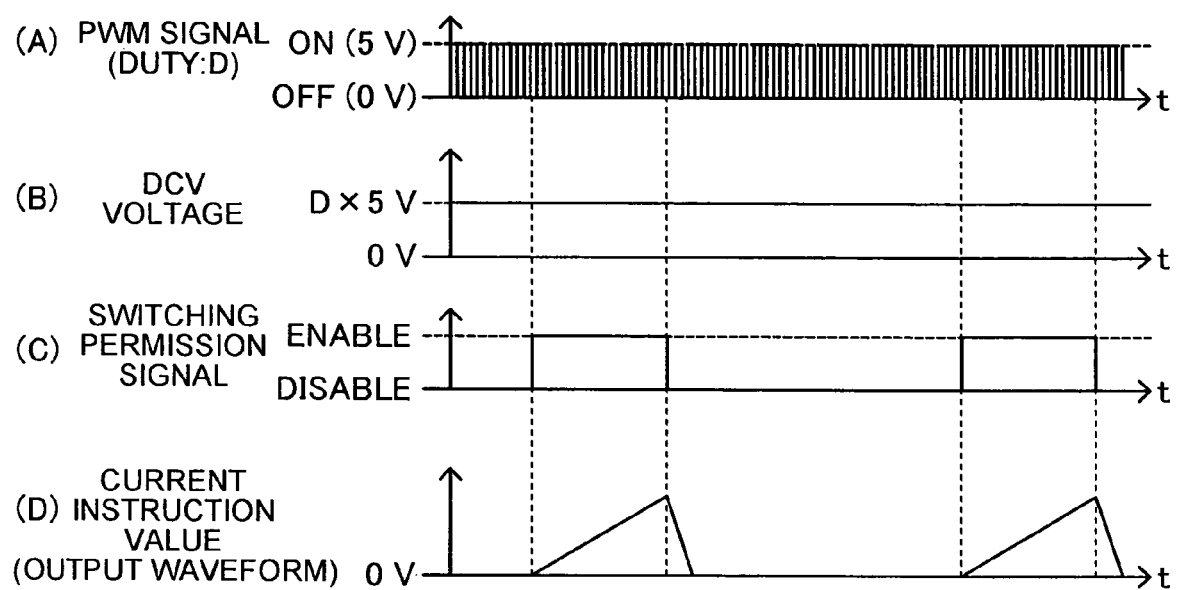
FIG. 12 depicts timing chart of the current instruction value preparation unit.

(5) In a system in which an input current effective value significantly fluctuates, based on an input current effective value, an inclination of a current instruction value and the switching operation interval time Ton as a target time at which the switching operation is completed are changed to change the input current waveform to a trapezoidal waveform and a triangular waveform. current-instruction-value preparation unit An example of the structure and operation of the current-instruction-value preparation unit 150 of FIG. 1 will be described with reference to FIG. 11 and FIG. 12. FIG. 11 shows a schematic structure of the current-instruction-value preparation unit 150 of the above FIG. 2. FIG. 12 shows an example of a timing chart of the current-instruction-value preparation unit 150. FIG. 12 shows a case where the current instruction value is the one of a triangular wave.

The current-instruction-value preparation unit 150 calculates, based on voltage deviation (control amount) supplied from the arithmetic unit 300, a proportional term P and an integration term I. The current-instruction-value preparation unit 150 includes a PI controller 151 that calculates, based on these proportional term P and integration term I, a current instruction amplitude value; a PWM converter (D/A converter) 152 that converts the current instruction amplitude value to a PWM signal to output the PWM signal to the LPF 102; a low-pass filter (LPF) 153 that smoothes the PWM signal to output a DCV voltage; a voltage/current conversion circuit 154 that converts the DCV value to a DC current value (inclination instruction value) DCI; and an integration unit 155 that outputs a modeling waveform obtained by integrating the DC current value DCI as a current instruction value via an amplifier 156, for example.

The operation of the current-instruction-value preparation unit 150 having the structure as described above will be described. First, the PI controller 151 calculates, based on the voltage deviation (control amount) supplied from the arithmetic unit 300, the proportional term P and the integration term I to calculate, based on these proportional term P and integration term I, a current instruction amplitude value to output the value to the PWM converter 152. The PWM converter 152 converts the current instruction amplitude value to a PWM signal (see (A) in FIG. 12) to output the value to the LPF 153. The LPF 153 smoothes the PWM signal to output the DCV voltage (see (B) in FIG. 12) to the voltage/current conversion circuit 154.

The voltage/current conversion circuit 154 outputs a DC current value DCI in proportion to the DCV voltage. Here, the DC voltage value DCI can be represented by following Equation (3) when a proportional constant is assumed as Ki:

$$DCI = Ki \times DCV \tag{3}$$

This DC current value DCI flows in a capacitor C1 of the integration unit 155 or transistors Tr connected to both ends of the capacitor C1. When a transistor Tr1 is OFF, a voltage Vc at both ends of the capacitor C1 can be represented as shown in following Equation (4).

$$Vc = 1/C \times \int DCI \cdot dt \tag{4}$$

where C is a capacitance.

The voltage Vc at both ends of the capacitor C1 increases in a straight-line manner in proportion to the DC current value DCI. When a zero cross signal of a power source voltage is inputted, a switching permission signal (see (C) in FIG. 12) is allowed to be in an Enable (High output) status and the inverter 157 inputs a signal obtained by inverting the switching permission signal to a gate of the transistor Tr1 to cause the transistor Tr1 to be in an OFF status. As a result, electric charge accumulates in the capacitor C1 and the voltage Vc at both ends of the capacitor C1 increases in a straight-line manner in proportion to the DC current value DCI.

When the switching operation is completed, the switching permission signal (see (C) in FIG. 12) is allowed to be in a Disable (Low output) status and the gate of the transistor Tr1 is inputted with a signal obtained by inverting a switching permission signal by the inverter 157 to allow the transistor Tr1 to be in an ON status. As a result, both ends of the capacitor C1 are short-circuited and the electric charge accumulated in the capacitor C1 is discharged and the voltage Vc at both ends decreases toward 0V.

As described above, the integration unit 155 obtains a straight line part by integrating the DC current value DCI when the zero cross of the power source voltage is detected and resets, when the switching operation is completed, the integration value to prepare a current instruction value of a modeling waveform (triangular wave) in which a switching interval draws a straight line (see (D) in FIG. 12). In this manner, the integration unit 155 prepares a current instruction value of the modeling waveform in synchronization with the power source cycle. Thus, the inclination can be adjusted.

As described above, according to the above embodiment, a modeling waveform in which a predetermined harmonic component is reduced from a current waveform is generated as a current instruction value and, in the former half interval of the half cycle of the AC power source, the switching element is ON/OFF-controlled based on the comparison result between the input current and the current instruction value. Thus, the predetermined harmonic component can be reduced without causing an increase of reactor inductance and the power source harmonic regulation can be cleared even in a high current region without causing an increase of reactor inductance. Furthermore, when the same current region as that of the conventional system is used, reactor inductance can be reduced and thus the cost can be reduced.

Figure 13:
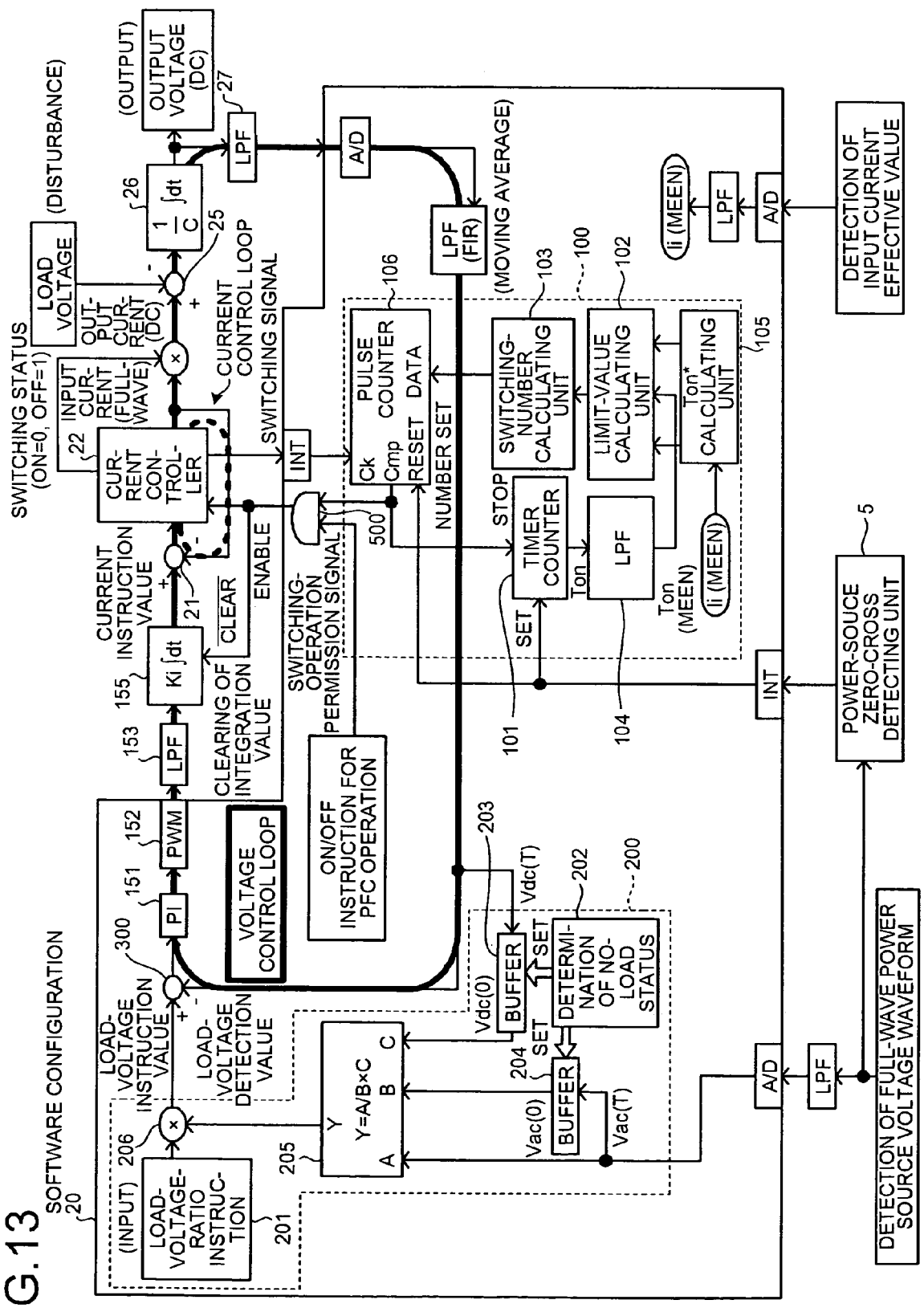
FIG. 13 depicts detailed software configuration of the power source apparatus shown in FIG. 1.
Figure 14:
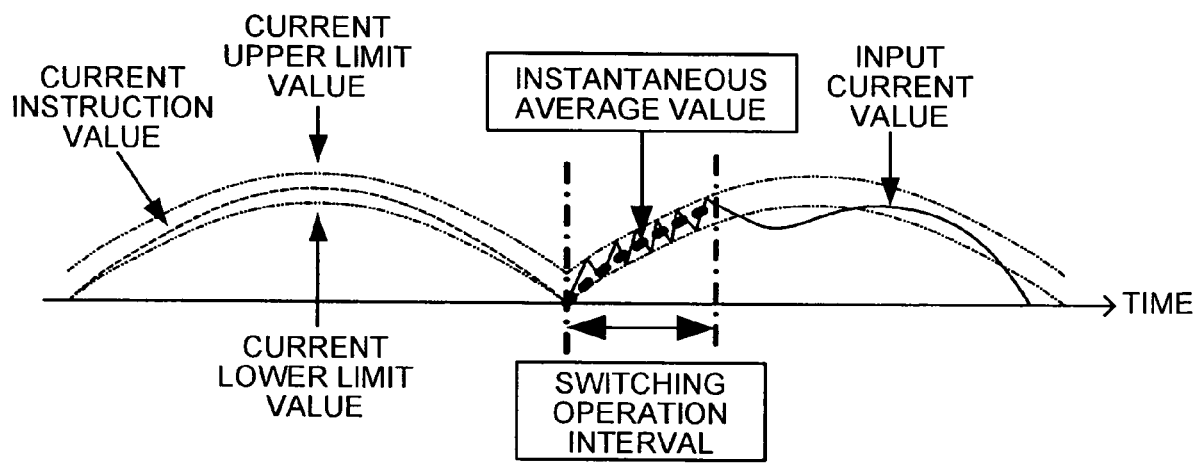
FIG. 14 depicts an input current waveform and an instantaneous average value of a switching interval in a conventional system.

When the switching control of the switching element 3c is configured by software, the converter block diagram of FIG. 13 for example can be used to provide a worldwide PFC according to the present invention. A software configuration 20 is realized by a microcomputer of the controller 13 of FIG. 1. Here, a loop not requiring a high-speed control such as a voltage control is configured by software.

A current controller 22 represents a switching operation controller by a power system main circuit by the current comparator 400, the logic circuit 500, the gate driving circuit 7, and the switching element (IGBT) 3c shown in FIG. 2 for example.

A bus voltage proportional controller 200 includes a voltage proportion instruction unit 201 that outputs an output bus voltage ratio instruction value (ratio value) A for suppressing the variation of output voltages; a no-load status determination unit 202 that switches an output voltage Vdc(t) and a full-wave voltage Vac(t) of an input power source voltage for an unloaded status and a loaded status; a buffer 203 that stores therein an unloaded output voltage Vdc(0); a Buffer 204 that stores therein a full-wave voltage Vac(0) of an unloaded input power source voltage; a calculating unit 205 that calculates Y=Vac(t)/Vac(0)×Vo(0); and a multiplier 206 that calculates a bus-voltage instruction value (load voltage instruction value )Vo*(t)=A×Y to output the result.

An outline of an operation of the power source apparatus shown in FIG. 13 will be described. First, the arithmetic unit 300 calculates the deviation between a load voltage instruction value depending on a power source environment and a machine to be used and a detected output voltage value. Based on this deviation, a PI (proportional integration) 151 calculates a proportional term P and calculates the integration term I. Based on these proportional term P and integration term I, a current instruction amplitude value is calculated.

The current instruction amplitude value is converted by the PWM converter 152 to a PWM signal. Thereafter, a current instruction value obtained by the integration by the integration unit 155 is outputted via the LPF 153 to the calculating unit 21. Based on the current instruction value, a current control is performed.

In this current control, deviation between the current instruction value and the input current is calculated by the calculating unit 21 and this is inputted to the current controller 22 to perform the operation. The pulse counter 106 starts a count operation based on the reset signal from the power-source phase detection circuit (zero cross) 5.

The current controller 22 turns ON or OFF the switching element 3c such that the input current is within a range from an upper limit value to a lower limit value and outputs this switching-number information to the pulse counter 106.

When the count value of the pulse counter 106 reaches the predetermined value, then a switching permission signal for prohibiting the switching of the switching element 3c is allowed to be at the level L. Based on this switching permission signal at the level L, the current controller 22 stops the ON/OFF operation of the switching element 3c.

On the other hand, the input current (full-wave) obtained by the above operation of the current controller 22 is fed back to the calculating unit 21. This input current (full-wave) is multiplied with the switching status and is used as output current. This output current is added with load current by disturbance by the calculating unit 25 and this is integrated by the integration unit 26 and is used as an output voltage.

The output voltage is used as a power source voltage of the load 4 and is subjected to noise removal by the LPF 27 and is fed back to the above software configuration 20. This fed back output voltage is caused by the A/D conversion unit to be a detected output voltage value of the above arithmetic unit 300.

As described above, according to the above software configuration, parameters depending on various statuses can be used to appropriately perform a switching control of the switching element 3c and to prevent the cost of the power source apparatus (hardware) from increasing.

The above embodiment uses a boost chopper-type power factor improving circuit. Thus, the above embodiment can be used not only for the representative circuits shown in FIG. 1 but also for all power source short circuits via a reactor.

According to an aspect of the present invention, in a power source apparatus that short-circuits, when an AC power source is converted to a DC voltage as a load voltage, the AC power source via a reactor to improve a power factor, a power factor-improving unit includes the reactor and a switching element and uses the output voltage as a load voltage; a current-instruction-value preparation unit generates, as a current instruction value, a modeling waveform obtained by reducing a harmonic component of a predetermined order from a current waveform; and a switching control unit ON/OFF-controls the switching element in a former half interval of a half cycle of an AC power source based on a comparison result between input current and the current instruction value. Thus, an effect is provided by which a power source apparatus can be provided that can reduce a predetermined harmonic component without causing an increase of a reactor inductance and that can clear, even in a high current region, a power source harmonic regulation without causing an increase of a reactor inductance.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power source apparatus that converts AC power to DC voltage, the power source comprising:
   a power factor-improving unit that includes a reactor and a switching element and outputs an output voltage as a load voltage to a load;
   a current-instruction-amplitude-value preparation unit that generates a current instruction amplitude value based on a deviation between a target output voltage instruction value and the output voltage;
   a current-instruction-value preparation unit that generates, as a current instruction value, a modeling waveform obtained by reducing a harmonic component of a predetermined order from a current waveform; and
   a switching control unit that ON/OFF-controls the switching element in an interval of the former half of a half cycle of the AC power based on a comparison result obtained by comparing an input current and the current instruction value, wherein
   the current-instruction-value preparation unit includes an integration unit that integrates a DC current value depending on the current instruction amplitude value to prepare the current instruction value according to which the former half of the half cycle of the AC power is a straight line part.

2. The power source apparatus according to claim 1, wherein the modeling waveform is generated in an interval of a half cycle of the AC power or an entire cycle of the AC power having any one of a substantially-triangular wave, a substantially-trapezoidal wave, and a substantially-rectangular wave.

3. The power source apparatus according to claim 1, wherein the modeling waveform is defined by a function of $Y=a \times t+b$ by using a power source voltage zero cross as a reference, where "Y" is the current instruction value, "t" is a time passed since a zero cross or a phase, "a" is an inclination, and "b" is offset.

4. The power source apparatus according to claim 1, wherein, in order to shape an input current waveform to be the modeling waveform, a switching operation of the switching element is performed, in the former half of the half cycle of the power source half cycle, such that the input current waveform follows the current instruction value and, in the latter half of the half cycle of the AC power, a magnitude of an output voltage is adjusted.

5. The power source apparatus according to claim 4, wherein, in order to shape the input current waveform to be the substantially-triangular waveform, a switching operation of the switching element is performed, in the former half of the half cycle of the power source half cycle, such that the input current waveform follows the current instruction value and, in the latter half of the half cycle of the AC power, a control is provided to flow current in a passive operation.

6. The power source apparatus according to claim 4, wherein, in order to shape the input current waveform to be the substantially-trapezoidal waveform, a switching operation of the switching element is performed, in the former half of the half cycle of the power source half cycle, such that the input current waveform follows the current instruction value and, in the latter half of the half cycle of the AC power, a control is provided to flow current in a passive operation and the output voltage is controlled to control the length of an upper base interval of the trapezoidal wave of the input current waveform.

7. The power source apparatus according to claim 2, wherein, based on an input current effective value, an inclination of the modeling waveform and a target time at which a switching operation is completed are changed to change the input current waveform to the trapezoidal waveform and the triangular waveform.

8. The power source apparatus according to claim 1, wherein the harmonic component of the predetermined order is a 5-th harmonic component.

* * * * *